United States Patent
Sun et al.

(10) Patent No.: US 11,893,020 B2
(45) Date of Patent: Feb. 6, 2024

(54) ENHANCING DATABASE QUERY PROCESSING

(71) Applicant: International Business Machines Corporation, Armonk, NY (US)

(72) Inventors: Sheng Yan Sun, Beijing (CN); Xiaobo Wang, Beijing (CN); Hong Mei Zhang, Beijing (CN); Shuo Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 17/647,402

(22) Filed: Jan. 7, 2022

(65) Prior Publication Data

US 2023/0222124 A1 Jul. 13, 2023

(51) Int. Cl.
*G06F 16/2453* (2019.01)
*G06F 16/22* (2019.01)

(52) U.S. Cl.
CPC .... *G06F 16/24544* (2019.01); *G06F 16/2264* (2019.01); *G06F 16/24532* (2019.01)

(58) Field of Classification Search
CPC ........... G06F 16/24544; G06F 16/2264; G06F 16/24532
See application file for complete search history.

(56) References Cited

U.S. PATENT DOCUMENTS 5,084,815 A * 1/1992 Mazzario .................. G06F 7/36
715/255
5,960,428 A * 9/1999 Lindsay ............ G06F 16/24544
8,983,919 B2 3/2015 Gislason
2006/0282422 A1* 12/2006 Al-Omari ......... G06F 16/24544
2011/0055199 A1* 3/2011 Siddiqui ............. G06F 16/2456
707/E17.017

(Continued)

OTHER PUBLICATIONS

Bajda-Pawlikowski et al., "Efficient processing of data warehousing queries in a split execution environment", SIGMOD '11: Proceedings of the 2011 ACM SIGMOD International Conference on Management of data Jun. pp. 1165-1176https://doi.org/10.1145/1989323.1989447 (Year: 2011).*

(Continued)

*Primary Examiner* — Mark D Featherstone
*Assistant Examiner* — Kweku William Halm
(74) *Attorney, Agent, or Firm* — Richard B. Thomas

(57) ABSTRACT

A system, program product, and method for enhancing automatic multidimensional query processing. The method includes executing a database query including semi-joining a plurality of dimension tables with a fact table. The method also includes identifying for extraction one or more data values from each dimension table of the plurality of dimension tables. The data values from each dimension table of the plurality of dimension tables are associated with a respective record identification (RID), thereby defining one or more RIDs. The method further includes generating a plurality of RID lists. Each RID list of the plurality of RID lists includes a collection of the one or more RIDs for the respective dimension table. The method also includes merging the plurality of RID lists, sorting, subject to the merging, the plurality of RIDs as a function of data location, and fetching the data values from the fact table.

20 Claims, 15 Drawing Sheets

(56) References Cited

U.S. PATENT DOCUMENTS

| | | | |
|---|---|---|---|
| 2012/0054249 A1* | 3/2012 | Batra | G06F 16/283 |
| | | | 707/805 |
| 2013/0117255 A1* | 5/2013 | Liu | G06F 16/2456 |
| | | | 707/E17.017 |
| 2013/0117305 A1* | 5/2013 | Varakin | G06F 9/5072 |
| | | | 707/769 |
| 2013/0173528 A1* | 7/2013 | Betawadkar-Norwood | |
| | | | G06F 16/24535 |
| | | | 707/E17.014 |
| 2016/0055206 A1* | 2/2016 | Becerra | G06F 9/3887 |
| | | | 707/713 |
| 2019/0266267 A1 | 8/2019 | Ma | |
| 2019/0294621 A1 | 9/2019 | Konik | |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

Wang et al., "Efficient Query Processing Framework for Big Data Warehouse—an almost Join-Free Approach," Frontiers of Computer Science, Apr. 2015, 13 pages.

* cited by examiner

ENHANCING DATABASE QUERY PROCESSING

BACKGROUND

The present disclosure relates to automatic multidimensional query processing, and, more specifically, to automatically merging and sorting record identifications (RIDs) prior to executing data fetches to satisfy a database query.

Many known database applications configured for online analytical processing (OLAP) and analytics operational data store (ODS) database applications employing star schema or snowflake schema include a central fact table. The fact table often represents an event such as a sale or order. The fact table is typically surrounded by one or more dimension tables containing the attributes (characteristics) of those facts, such as a product dimension with product details, a store dimension with commercial outlet details, a temporal dimension with production and shipping time frames, etc. For those respective snowflake schema, the dimensions are normalized. The principle behind snowflaking is normalization of the dimension tables by removing low cardinality attributes and forming separate tables, i.e., normalization splits up data to avoid redundancy (duplication) by moving commonly repeating groups of data into new tables. Normalization therefore tends to increase the number of tables that need to be joined in order to perform a given query, but reduces the space required to hold the data and the number of places where it needs to be updated if the data changes. In contrast, the star schema is the simplest style of schema and is more effective for handling simpler queries, where the data in the dimension tables is not normalized and the respective dimensions have no existing join relationships directly with each other until brought together with the event of, e.g., a sale or ordering, as represented in the fact table. In some database star and snowflake joins, to consolidate independent dimension filtering, a Cartesian product of those dimension tables is formed for matching against a multi-column fact table index.

SUMMARY

A system, computer program product, and method are provided for enhancing automatic multidimensional query processing.

In one aspect, a computer system is provided for enhancing automatic multidimensional query processing. The system includes one or more processing devices and one or more memory devices communicatively and operably coupled to the one or more processing devices. The system also includes a database query enhancement tool, at least partially resident within the one or more memory devices, configured to execute an enhancement directed toward the automatic multidimensional query processing to execute a database query. The database query enhancement tool is also configured to semi-join a plurality of dimension tables with a fact table. The database query enhancement tool is further configured to identify for extraction one or more data values from each dimension table of the plurality of dimension tables. The one or more data values from each dimension table of the plurality of dimension tables are associated with a respective record identification (RID), thereby defining one or more RIDs. The database query enhancement tool is further configured to generate a plurality of RID lists. Each RID list of the plurality of RID lists includes a collection of the one or more RIDs for the respective dimension table. The database query enhancement tool is also configured to merge the plurality of RID lists, sort, subject to the merging, the plurality of RIDs as a function of data location, and fetch the data values from the fact table.

In another aspect, a computer program product embodied on at least one computer readable storage medium having computer executable instructions for enhancing automatic multidimensional query processing that when executed cause one or more computing devices to semi-join a plurality of dimension tables with a fact table and identify for extraction one or more data values from each dimension table of the plurality of dimension tables. The one or more data values from each dimension table of the plurality of dimension tables are associated with a respective record identification (RID), thereby defining one or more RIDs. The computer executable instructions when executed also cause the one or more computing devices to generate a plurality of RID lists. Each RID list of the plurality of RID lists includes a collection of the one or more RIDs for the respective dimension table. The computer executable instructions when executed further cause the one or more computing devices to merge the plurality of RID lists, sort, subject to the merging, the plurality of RIDs as a function of data location, and fetch the data values from the fact table.

In yet another aspect, a computer-implemented method is provided for enhancing automatic multidimensional query processing. The method includes executing a database query through semi-joining a plurality of dimension tables with a fact table and identifying for extraction one or more data values from each dimension table of the plurality of dimension tables. The one or more data values from each dimension table of the plurality of dimension tables are associated with a respective record identification (RID), thereby defining one or more RIDs. The method also includes generating a plurality of RID lists. Each RID list of the plurality of RID lists includes a collection of the one or more RIDs for the respective dimension table. associated with a respective record identification (RID), thereby defining one or more RIDs. The method further includes merging the plurality of RID lists, sorting, subject to the merging, the plurality of RIDs as a function of data location, and fetching the data values from the fact table.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
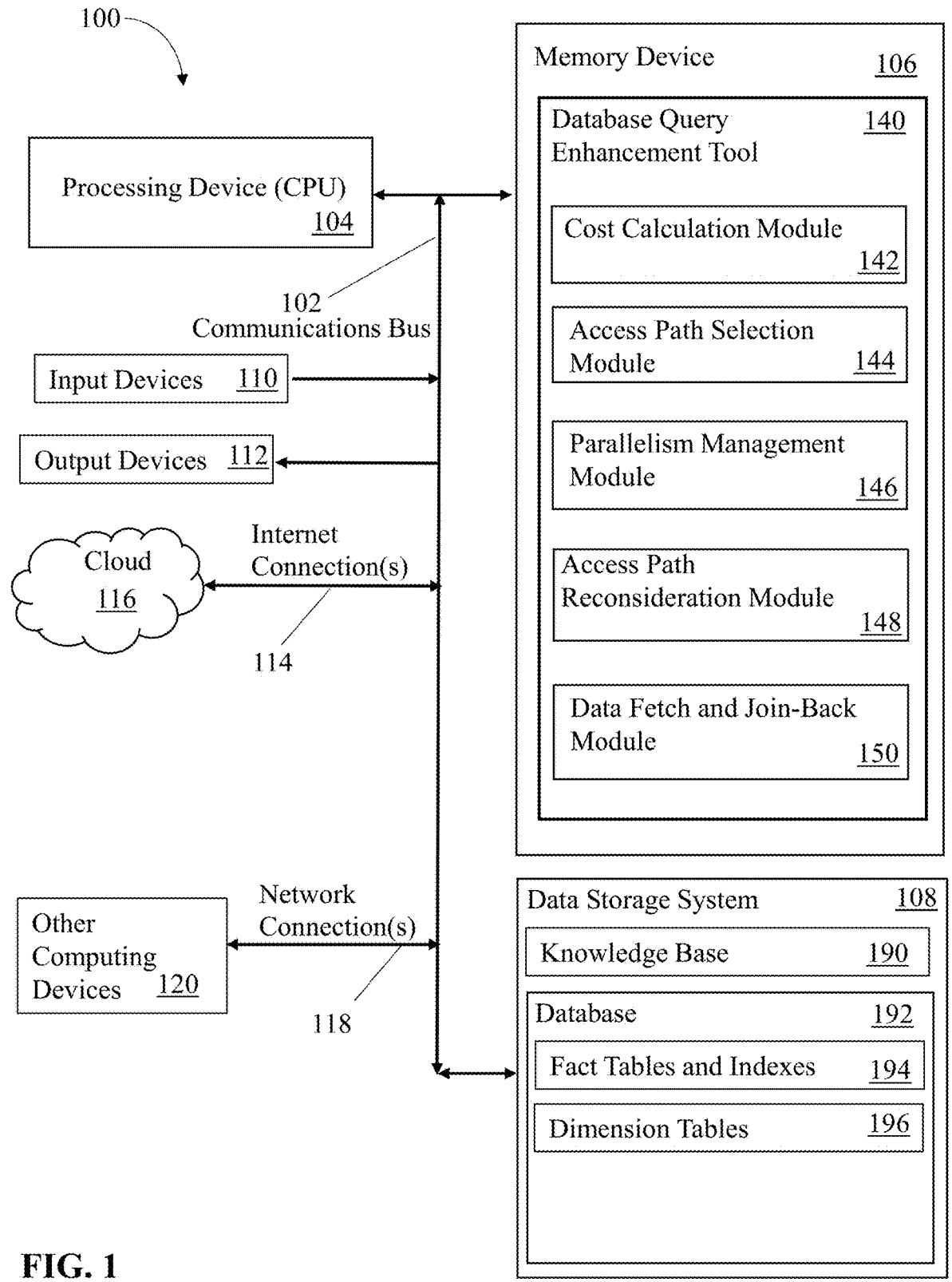
FIG. 1 is a block schematic diagram illustrating a computer system for enhancing automatic multidimensional query processing, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to enhancing automatic multidimensional query processing. While the present disclosure is not necessarily limited to such applications, various aspects of the disclosure may be appreciated through a discussion of various examples using this context.

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Many known database applications configured for online analytical processing (OLAP) and analytics operational data store (ODS) database applications employing star schema or snowflake schema include a central fact table. The fact table often represents an event such as a sale or order. In general, the fact table contains data columns for alphanumeric values associated with a business. The fact table also includes a set of columns that each define one or more foreign keys to draw data from one or more respective dimension tables. The fact table is typically surrounded by one or more dimension tables containing the attributes (characteristics) of those facts, such as a product dimension with product details, a store dimension with commercial outlet details, a temporal dimension with production and shipping time frames, etc. For those respective snowflake schema, the dimensions are normalized. Each dimension table includes a primary key that corresponds to the respective foreign key in the fact table. The principle behind snowflaking is normalization of the dimension tables by removing low cardinality attributes and forming separate tables, i.e., normalization splits up data to avoid redundancy (duplication) by moving commonly repeating groups of data into new tables. Normalization therefore tends to increase the number of tables that need to be joined in order to perform a given query, but reduces the space required to hold the data and the number of places where it needs to be updated if the data changes. In contrast, the star schema is the simplest style of schema and is more effective for handling simpler queries, where the data in the dimension tables is not normalized and the respective dimensions have no existing join relationships directly with each other until brought together with the event of, e.g., a sale or ordering, as represented in the fact table.

In some database star schema joins and snowflake schema joins, to consolidate independent dimension filtering, a Cartesian product of those dimension tables is formed for matching against a multi-column fact table index. This Cartesian approach has numerous challenges, which include building a very large number of combinations of data values that may not exist in the fact table, where such additional data is substantially useless data. In addition, since database indexes tend to consume memory resources, the additional requirement of a possibly very large fact table index to support the previously mentioned data filtering for queries will likely consume a significant portion of the available memory resources, thereby possibly imposing computing performance issues and/or requiring increased physical memory.

A system, computer program product, and method are disclosed and described herein for enhancing automatic multidimensional query processing, and, more specifically, for to automatically merging and sorting record identifications (RIDs) prior to executing data fetches to satisfy a database query. The system, computer program product, and method facilitate enhanced processing of incoming queries to a database that includes one of a star schema and a snowflake schema, i.e., a fact table and a plurality of dimension tables.

Referring to FIG. 1, a block schematic diagram is presented illustrating a computer system, i.e., a database query processing enhancement system 100 (herein referred to as "the system 100") that is configured for automatic multidimensional query processing, and, more specifically, for automatically merging and sorting record identifications (RIDs) prior to executing data fetches to satisfy a database query. The system 100 includes one or more processing devices 104 (only one shown) communicatively and operably coupled to one or more memory devices 106 (only one shown) through a communications bus 102, and in some embodiments, through a memory bus (not shown). In some embodiments, the processing device 104 is a multicore processing device. The system 100 also includes a data storage system 108 that is communicatively coupled to the processing device 104 and memory device 106 through the communications bus 102. In at least some embodiments, the data storage system 108 provides storage to, and without limitation, a knowledge base 190 that includes at least a portion of the data and software artifacts to enable operation of the system 100 as described further herein.

The system 100 further includes one or more input devices 110 and one or more output devices 112 communicatively coupled to the communications bus 102. In addition, the system 100 includes one or more Internet connections 114 (only one shown) communicatively coupled to the cloud 116 through the communications bus 102, and one or more network connections 118 (only one shown) communicatively coupled to one or more other computing devices 120 through the communications bus 102. In some embodiments, the Internet connections 114 facilitate communication between the system 100 and one or more cloud-based centralized systems and/or services (not shown in FIG. 1). In at least some embodiments, the system 100 is a portion of a cloud computing environment (see FIG. 12), e.g., and without limitation, the system 100 is a computer system/server that may be used as a portion of a cloud-based systems and communications environment through the cloud 116 and the Internet connections 114.

In one or more embodiments, a database query enhancement tool 140 (herein referred to as "the tool 140") is resident within the memory device 106. The tool 140 is configured to facilitate performing automatic multidimensional query processing, and, more specifically, automatically merging and sorting record identifications (RIDs) prior to executing data fetches to satisfy a database query. In at least some embodiments, the tool 140 resident in the memory device 106 is configured to run continuously in the background to automatically execute the automatic multidimensional query processing. In some embodiments, the tool 140 is engaged for specific tasking by the users thereof. The tool 140 is discussed in detail further in this disclosure. Accordingly, the components in the tool 140 and the data storage system 108 are discussed further with respect to FIGS. 2-10.

Figure 2:
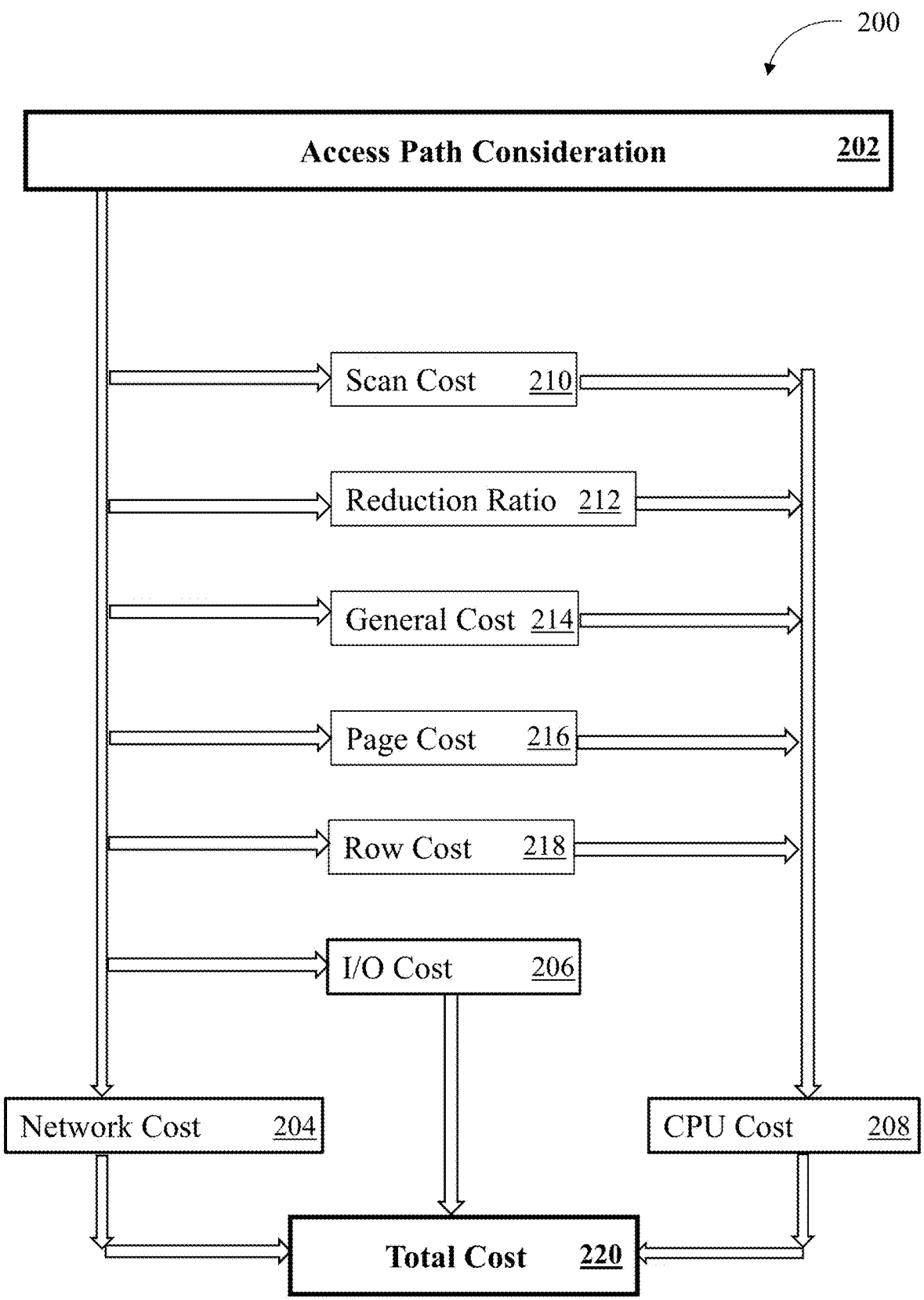
FIG. 2 is a block schematic diagram illustrating a resource consumption costs calculation mechanism, in accordance with some embodiments of the present disclosure.

Referring to FIG. 2, a block schematic diagram is presented illustrating a resource consumption costs calculation mechanism 200 (herein referred to as the mechanism 200), in accordance with some embodiments of the present disclosure. In some embodiments, the mechanism 200 is resident in the cost calculation module 142 (shown in FIG. 1). The mechanism 200 executes a resource cost calculation for an incoming database query, i.e., the mechanism 200 considers one or more query block access paths for the incoming database query. A query block is the basic unit of Structured Query Language (SQL) that operates on tables or the results of other queries by performing join, grouping, projection, or selection operations. The result of a query block is a table that is known as a derived table. The query access path, i.e., the access path for a query statement specifies how the database management system accesses the data that the query specifies. The access path specifies the indexes and tables that are to be accessed, the access methods that will be used, and the order in which objects are accessed at least partially as a first determination of the evaluation order among the query blocks in the statement.

In one or more embodiments, the various access paths of the respective queries are determined through summing the various resource costs, i.e., computing resource consumption, of each respective access path, where the lowest computing resource cost access path will be automatically selected. In at least some embodiments, the mechanism 200 performs an access path consideration calculation 202 through consideration of the known resource consumption costs. Such costs include a network cost 204, an I/O cost 206, and a CPU cost 208. In some embodiments, the CPU cost 208 includes costs such as, and without limitation, a scan cost 210, reduction ratio 212, a general cost 214, a page cost 216, and a row cost 218. The network cost 204, the I/o cost 206, and the CPU cost 208 are summed to generate the total cost 220 of the respective access path. The access paths that minimize the total resource costs 220 for the block are chosen from a tree of multiple potential path choices by the access path selection module 144 (shown in FIG. 1). In some embodiments, the elements of the cost calculation module 142 and the access path selection module 144 are combined into a single module. In some embodiments, any methods and associated cost components directed toward calculating the costs of the various access paths that enable operation of the system and methods described herein are used. In some embodiments, the respective resource consumption costs are expressed as monetary units. Accordingly, the access path with the lowest total resource cost 220 with respect to the calculated computing resource consumption of the respective incoming database query is selected.

Figure 3:
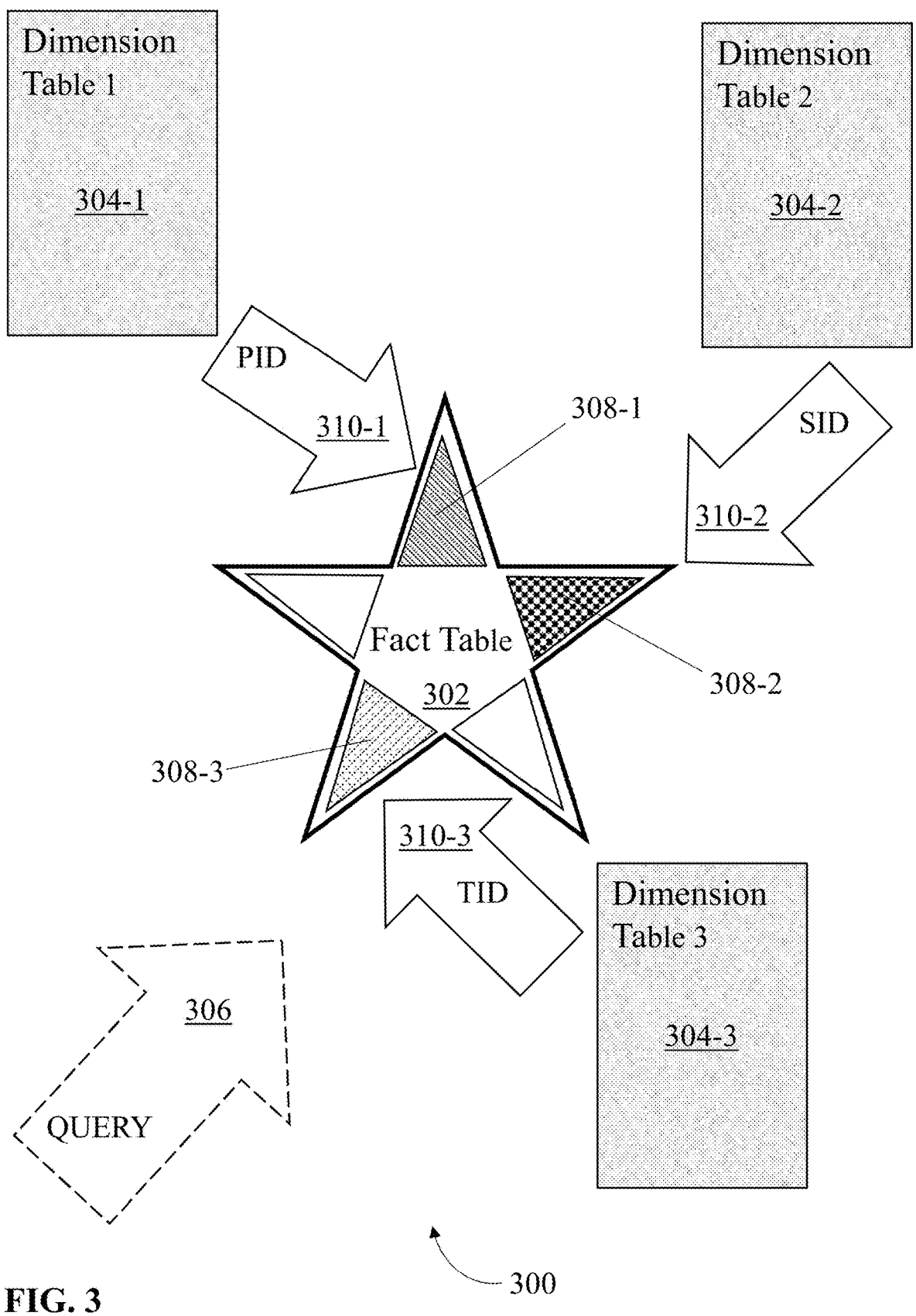
FIG. 3 is a block schematic diagram illustrating an index access scheme in accordance with some embodiments of the present disclosure.

Referring to FIG. 3, a block schematic diagram is presented illustrating an index access scheme 300, in accordance with some embodiments of the present disclosure. The index access scheme 300 includes a fact table 302 and three dimension tables (where the number 3 is non-limiting), collectively referred to as dimension tables 304. The fact table 302 is stored with any other fact tables and their respective indexes (described below) in the fact table and indexes 194 portion of the database 192 (see FIG. 1). While one database 192 is shown in FIG. 1, the data storage system 108 is configured to maintain a plurality of databases 192 resident therein.

The dimension tables 304 include a first dimension table 304-1, a second dimension table 304-2, and a third dimension table 304-3. The dimension tables 304 are stored in the dimension tables 196 portion of the database 192. The index access scheme 300 is shown in FIG. 3 as a star schema database; however, snowflake schema databases are also candidates for the index access scheme 300. In some embodiments, an example query 306 is directed towards a sales summary for a particular product sold in particular stores during a particular time period. The first dimension table 304-1 is configured to store the names of the product offerings (P), the second dimension table 304-2 is configured to store the names of the stores (S) that are authorized to sell the products (P), and the third dimension table 304-3 is configured to store the various time periods (T) that are of interest to the users. Therefore, the query 306 in the present example is: "how many units of the product (P) have been sold from each store (S) during the time period (T)?"

In at least some embodiments, the respective database query 306 is executed through parallelism, i.e., additional dimensions with the requested data components are included, where the additional dimension tables 304 are independently joined with the fact table 302 through a respective fact table index. In some embodiments, the parallelism features as described herein are executed through a parallelism management module 146 (see FIG. 1). FIG. 3 shows three fact table indexes collectively referred to as fact table indexes 308, where each fact table index 308 is a separate index for each respective dimension table 304 to facilitate executing the filtering of the respective dimension table 304 during database query processing. Specifically, the fact table 302 includes a first index 308-1 associated with the first dimension table 304-1, a second index 308-2 associated with the second dimension table 304-2, and a third index 308-3 associated with the third dimension table 304-3. The relationships between the fact table 302 and the respective dimension tables 304 are identified and the corresponding fact table indexes 308 are selected. The selected dimension tables 304 are paired with the fact table 302 through the respective indexes 308, where the respective pairings are shown as a PID (product record identification) pairing 310-1, a SID (store record identification) 310-2, and a TID (time period record identification) pairing 310-3. Accordingly, each query calculation examines the respective index performances to choose the most effective dimension table/fact table index pairs.

Therefore, in at least some embodiments, for a given database query 306, the fact table 302 and the respective dimension tables 304 are paired through the respective fact table indexes 308. In some embodiments, the pairing is executed through the parallelism management module 146 (see FIG. 1). The appropriate, i.e., specifically selected columns (not shown in FIG. 3) from the respective dimension tables 304 are joined to the fact table 302 to extract the data from the dimension tables' columns. In some embodiments, the joined dimension table/fact table index pairs 310 define a semi-join, or partial join, between the dimension tables 304 and the fact table 302, where such semi-joins are discussed further with respect to FIGS. 4 and 5. In some embodiments, the database query enhancement mechanisms include generating filtering estimates based on existing filtering statistics. Such filtering estimates include, without limitation, table cardinality (the number of distinct values in a table column relative to the number of rows in the respective table) and cluster ratio (indicative of the packing of the data as a function of facilitating query execution). In some of such embodiments, the estimations may be inaccurate and the filtering statistics will be updated with the more accurate data. Accordingly, the database query enhancement mechanisms execute run-time adaptations when the actual filtering data does not match the existing estimates.

In some embodiments, i.e., for those embodiments that use one or more of specialized dimension tables (to maintain specialized data) and specialized dimension table filters, the respective dimension tables will undergo a "drill-down" operation specifically configured to identify and extract the requested data from the identified dimension tables first, where the respective dimension tables are treated as another fact table. In some embodiments, such drilling-down is executed through the parallelism management module 146 (see FIG. 1).

In some embodiments, upon completion of the data extraction from the dimension tables' columns, a "join-back" operation directed toward the fact table index result set will be performed to skip or remove any unnecessary data that may have been inadvertently extracted from the dimension tables in advance of finalizing the results to the data filtering operations. In some embodiments, such joining-back is executed through the data fetch and join-back module 150 (see FIG. 1). The join-back features are discussed further with respect to FIG. 9.

Figure 4:
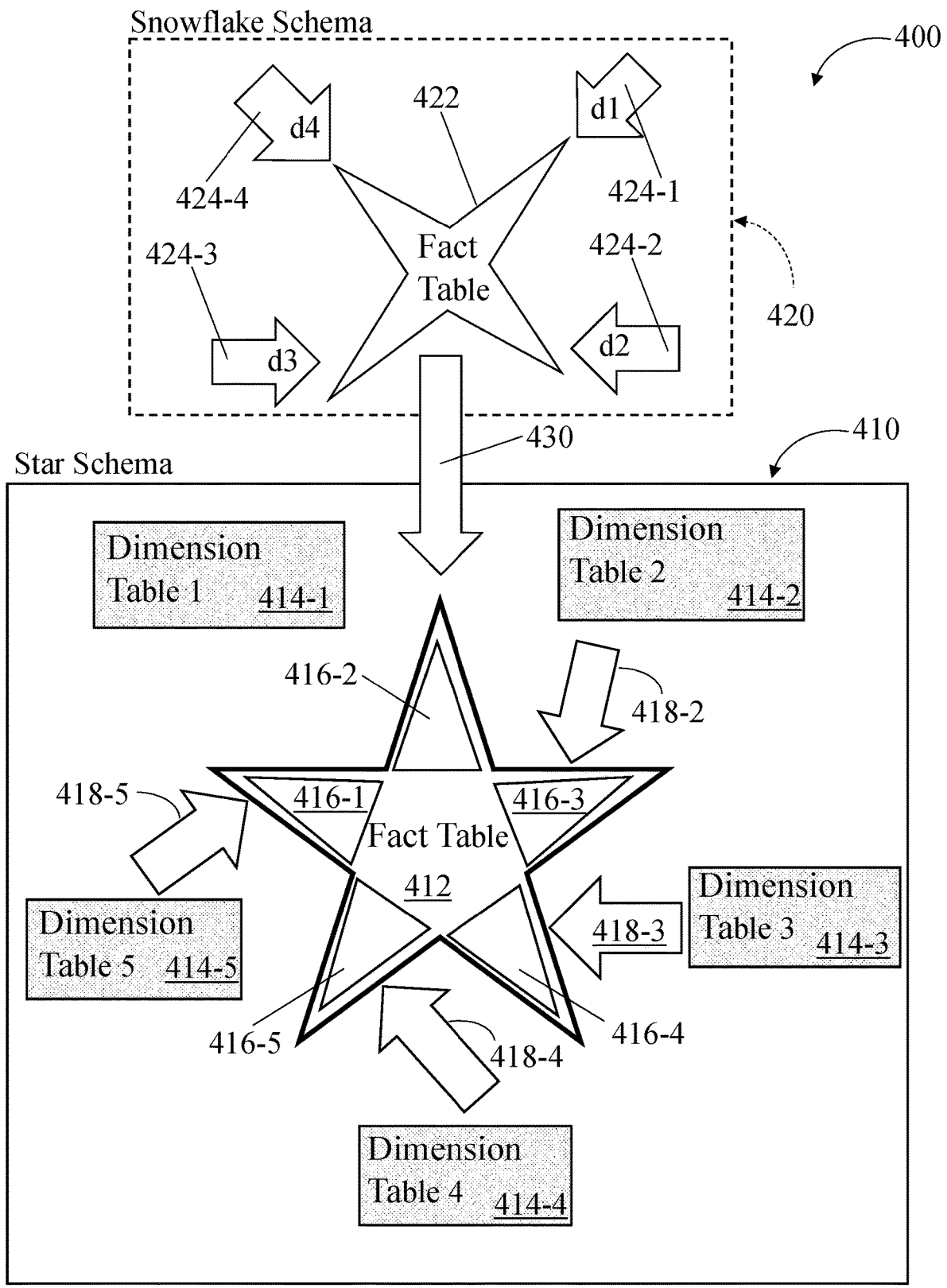
FIG. 4 is a block schematic diagram illustrating a parallel query optimization scheme, in accordance with some embodiments of the present disclosure.

Referring to FIG. 4, a block schematic diagram is presented illustrating a parallel query optimization scheme 400, in accordance with some embodiments of the present disclosure. In some embodiments, the parallel query optimization scheme 400 is executed through the parallelism management module 146 (see FIG. 1). The parallel query optimization scheme 400 includes a database with a star schema 410 similar to that shown in FIG. 3 (illustrating the index access scheme 300). The star schema 410 includes a fact table 410 and five dimension tables (where the number 5 is non-limiting), i.e., collectively referred to as dimension tables 414. The dimension tables 414 include a first dimension table 414-1, a second dimension table 414-2, a third dimension table 414-3, a fourth dimension table 414-4, and a fifth dimension table 414-5. The fact table 412 includes five fact table indexes collectively referred to as fact table indexes 416, where each fact table index 416 is a separate index for each respective dimension table 414 to facilitate executing the filtering of the respective dimension table 414 during database query processing. Specifically, the fact table 412 includes a first index 416-1 associated with the first dimension table 414-1, a second index 416-2 associated with the second dimension table 414-2, a third index 416-3 associated with the third dimension table 414-3, a fourth index 416-4 associated with the fourth dimension table 414-4, a fifth index 416-5 associated with the fifth dimension table 414-5. The selected dimension tables are dimension tables 414-2, 414-3, 414-4, and 414-5, and the respective pairings are 418-2, 418-3, 418-4, and 418-5. In the embodiment shown, the dimension table 414-1 was not selected since it was evaluated by the tool 140 to not provide any data values to satisfy the present database query.

In some embodiments, in addition to the star schema database 410, a database with a snowflake schema 420 is shown with its fact table 422 and pairings 424-1, 424-2, 424-3, and 424-4 with the respective dimension tables d1, d2, d3, and d4. The snowflake schema 420 and the star schema 410 are shown paired 430. Therefore, in some embodiments, parallelism further includes joins between multiple fact table-dimension table structures, where, without limitation, a pairing between a star schema and a snowflake schema is shown in FIG. 4. Pairings between any combinations of multiple star schema and multiple snowflake schema that enable operation of the system 100 and the tool 140 as described herein may be used. Accordingly, in some embodiments, in addition to the native database with the star schema or the snowflake schema, for the joins and the data extraction actions, the RID is further employed to join to other databases with star schema or snowflake schema, including their respective dimension tables to access the data fields therein.

Figure 5:
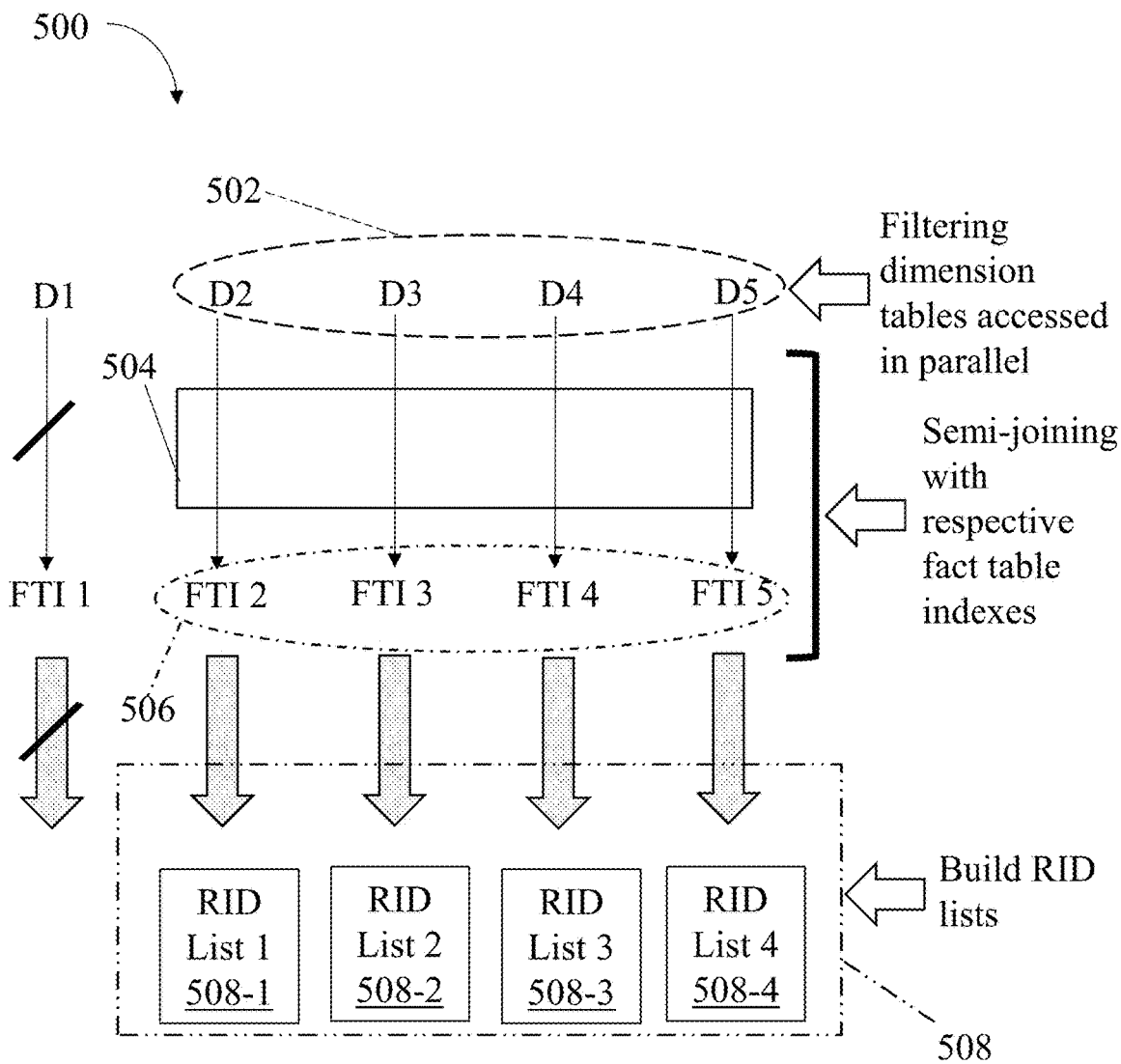
FIG. 5 is a block schematic diagram illustrating a scheme for generation of RID lists, in accordance with some embodiments of the present disclosure.

Referring to FIG. 5, a block schematic diagram is presented illustrating a scheme 500 for generation of RID lists, in accordance with some embodiments of the present disclosure. In some embodiments, the scheme 500 for generation of RID lists is executed through the parallelism management module 146 (see FIG. 1). Continuing to also refer to FIG. 4, in some embodiments, a record identification (herein referred to as the RID) is employed to extract data from the fact table 412 and the selected dimension tables 414, where each RID corresponds to a row of data, i.e., the respective record. The RIDs are collected through a matching index scan to match the selection criteria that are subject to the details of the database query. Each RID includes a page number that will be used for sorting as discussed further herein. In support of the parallelism aspects of the system 100, the scheme 500 includes the selected dimension tables 502, i.e., D2, D3, D4, and D5 (shown and referred to as dimension tables 414-2, 414-3, 414-4, and 414-5, respectively, in FIG. 4) that are accessed in parallel for the pending data filtering.

These dimension tables 502 are semi-joined to (i.e., partially-paired or partially-joined with) the respective fact table indexes FTI-2, FTI-3, FTI-4, and FTI-5 (shown and referred to as fact table indexes 416-2, 416-3, 416-4, and 416-5, respectively, in FIG. 4, and collectively referred to as the fact table indexes 506 in FIG. 5) in parallel. Such semi-joining as presented herein includes sufficient joining to execute the operations discussed further herein up to the actual extraction of data. Therefore, a plurality of semi-joins 504 are executed in parallel. In some embodiments, the joins 418-2, 418-3, 418-4, and 418-5, respectively, in FIG. 4 are the semi-joins 504. Each of the semi-joins 504 results in a respective RID list, i.e., RID list 1 (508-1), RID list 2 (508-2), RID list 3 (508-3), and RID list 4 (508-4), collectively referred to as RID lists 508. As such, in order to facilitate the parallel data collection for a database query response, a plurality of RID lists 508 are generated, where each RID list 508 is indicative of a respective semi-join 504 between the dimension tables 502 and the fact table 412. The RID lists 508 for each table-to-table semi-join 504 through the respective fact table indexes 506 identify the resultant set of data, and the respective data will be subsequently retrieved according to the respective RID list 508. In one or more embodiments, the data requested through the database queries as described herein will be fetched through a full-joining subject to a final RID list that is generated as described further herein. Specifically, the filtering dimensions, i.e., the full suite of the identified filtering dimension tables 502 are accessed in parallel.

Figure 6:
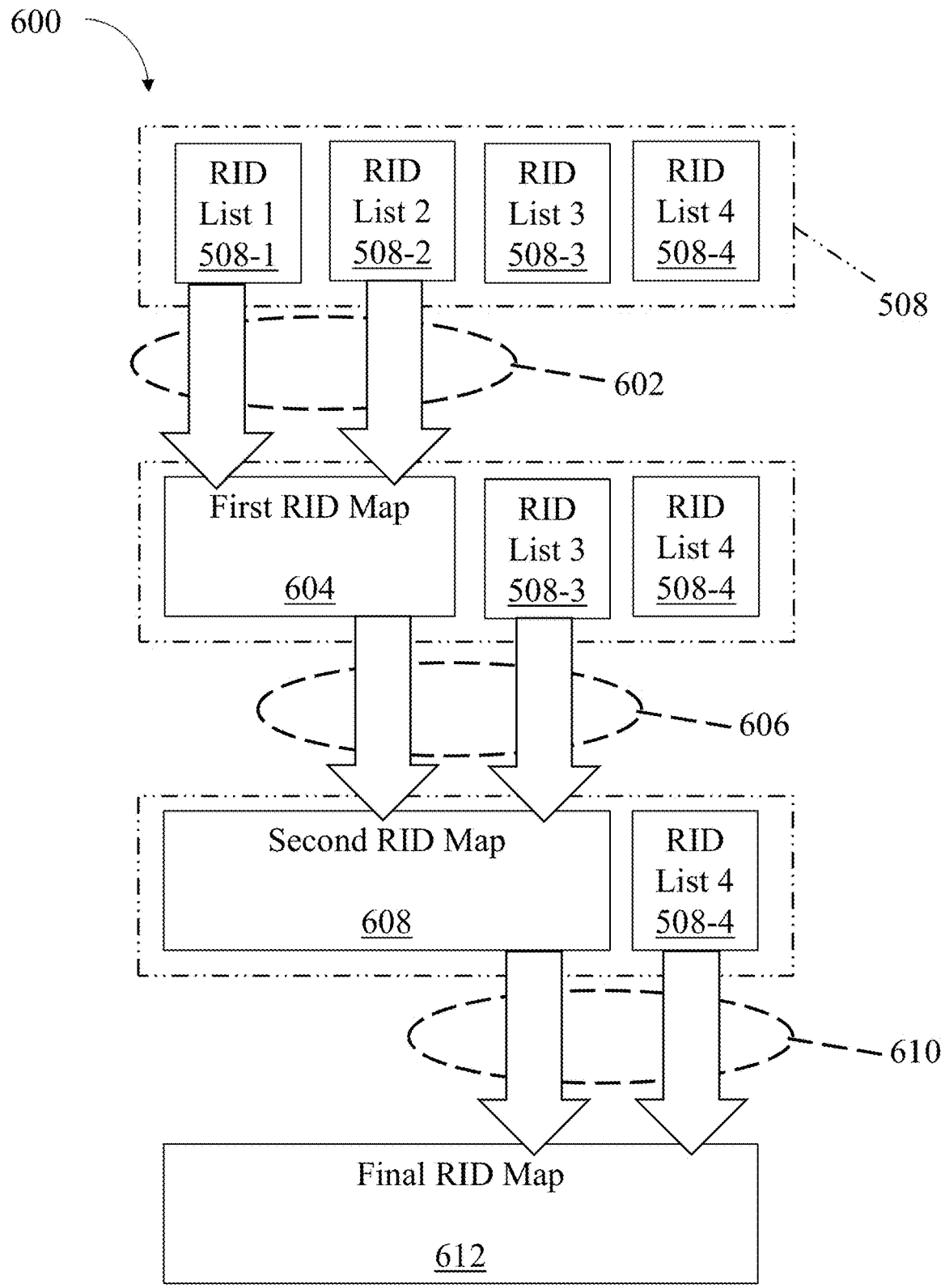
FIG. 6 is a block schematic diagram illustrating a scheme for merging the RID lists into a RID map, in accordance with some embodiments of the present disclosure.

Referring to FIG. 6, a block schematic diagram is presented illustrating a scheme 600 for merging the RID lists into a RID map, in accordance with some embodiments of the present disclosure. In some embodiments, the scheme 600 for merging the RID lists into a RID map is executed through the parallelism management module 146 (see FIG. 1). At least a portion of the numbering sequence from FIG. 5 is repeated in FIG. 6. The RID lists 508 are merged in manner that includes initially merging two RID lists 508. In the embodiments shown in FIG. 6, the RID list 1 (508-1) and RID list 2 (508-2) undergo an initial merger 602, where the selection of the aforementioned RID lists 508 is non-limiting, i.e., any two RID lists 508 may be selected for the initial RID list merging. The merging of the RID lists 508-1 and 508-2 includes intersecting (ANDing) the two lists. The initial merging 602 of the RID list 1 (508-1) and RID list 2 (508-2) results in the generation of a first RID map 604 that includes the intersected RIDs from each list. Similarly, the RID list 3 (508-3) is merged 606 with the first RID map 604 to generate a second RID map 608, and the RID list 4 (508-4) is merged 610 with the second RID map 608 to generate a final RID map 612. In some embodiments, any number of RID lists 508 may be merged to generate the final RID map 612. Accordingly, the final RID map 612 includes the intersection of all of the viable dimension filtering, i.e., all of the RIDs from all of the RID lists 508.

Figure 7:
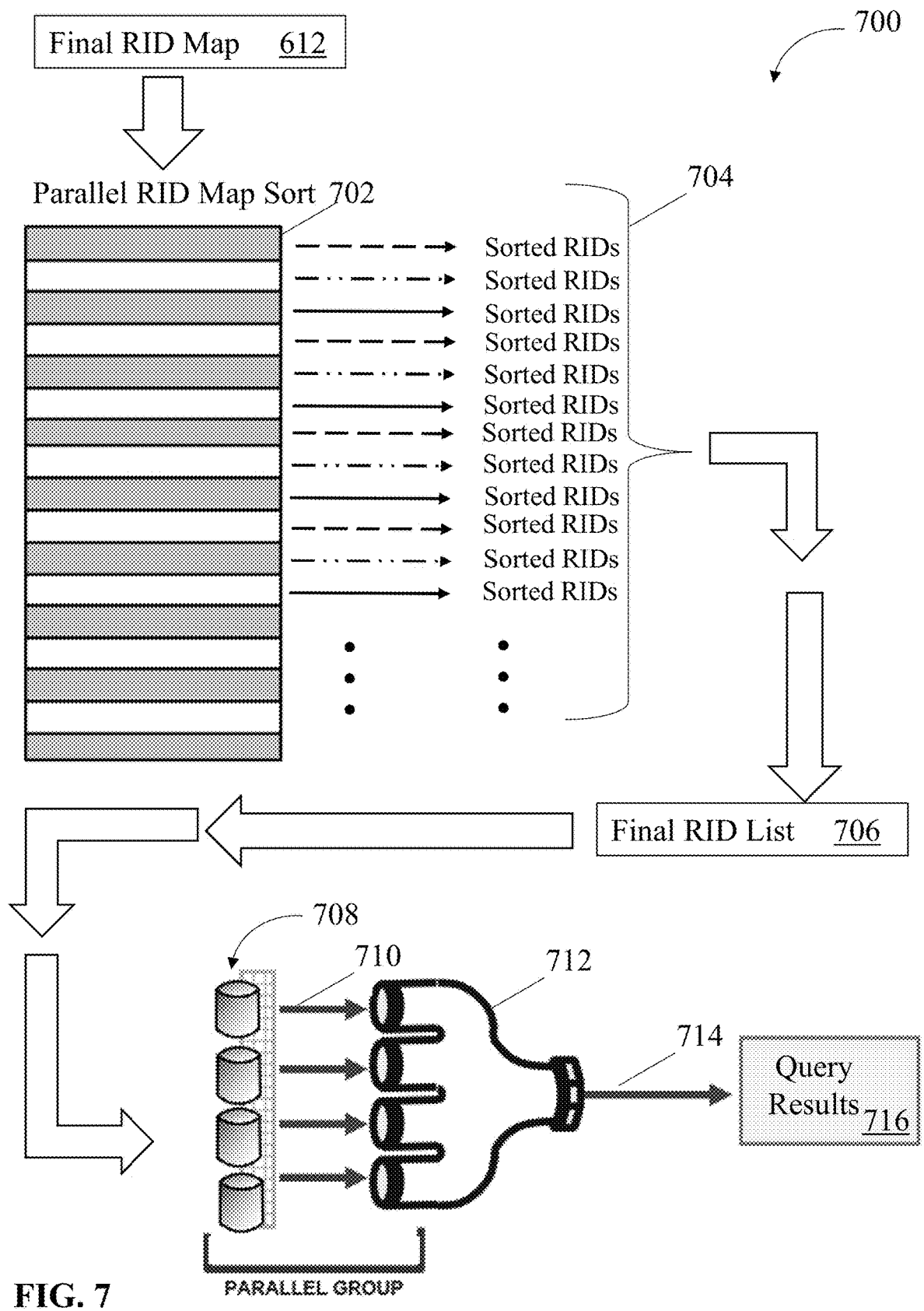
FIG. 7 is a block schematic diagram illustrating a RID sort prefetch scheme, in accordance with some embodiments of the present disclosure.

Referring to FIG. 7, a block schematic diagram is presented illustrating a RID sort prefetch scheme 700, in accordance with some embodiments of the present disclosure. In some embodiments, the RID sort prefetch scheme 700 is executed through the parallelism management module 146 (see FIG. 1) subject to the previously described semi-joinings 504. At least a portion of the numbering sequence from FIG. 6 is repeated in FIG. 7. The final RID map 612 with the intersected RIDS captured per FIG. 5 are transmitted to a parallel RID map sort mechanism 702 that is configured to sort the collection of RIDs as a function of the respective page numbers. The output of the parallel RID map sort mechanism 702 are the sorted RIDs 704 as a function of their respective page numbers. The sorted RIDs 704 are gathered to generate a final RID list 706. The final RID list 706 is used to access the respective records 708 in the fact table in parallel to extract the data therefrom subject to a full-join between the fact table 412 and the dimension tables 414-2, 414-3, 414-4, and 414-5 (see FIG. 4). The extracted data 710 from the records 708 is collected through a data collection mechanism 712 where the collected data 714 is used to generate the database query results 716 to the original database query.

In some embodiments, the described parallel prefetch sorting of the RID lists facilitates employment of the quicksort algorithm and a sort avoid algorithm. The quicksort algorithm is a "divide-and-conquer" algorithm that works by selecting a "pivot" data element from an array of data and partitioning the other data elements into two sub-arrays, according to whether they are less than or greater than the pivot, where the sub-arrays are then sorted recursively. This can be done in-place, requiring small additional amounts of memory to perform the sorting. The sort avoid algorithm maintains the existing ascending and descending order in the RID lists and indexes until a sorting operation is desired by a particular sorting algorithm.

In some embodiments, the plurality of individual RIDS, merged RIDS, RID lists, and RID maps are stored in a designated memory buffer in an artifact referred to as a RID pool. However, such memory buffers are finite in size and the accumulated contents of the RID pool due to one or more very large joins (resulting in large RID lists) may exceed the buffer size constraints. In such circumstances, in some embodiments, at least some of the contents of the RID pool are written to a data page file sometimes referred to as a work file that is resident in a memory artifact that may be slower with respect to data fetching and storing.

Figure 8A:
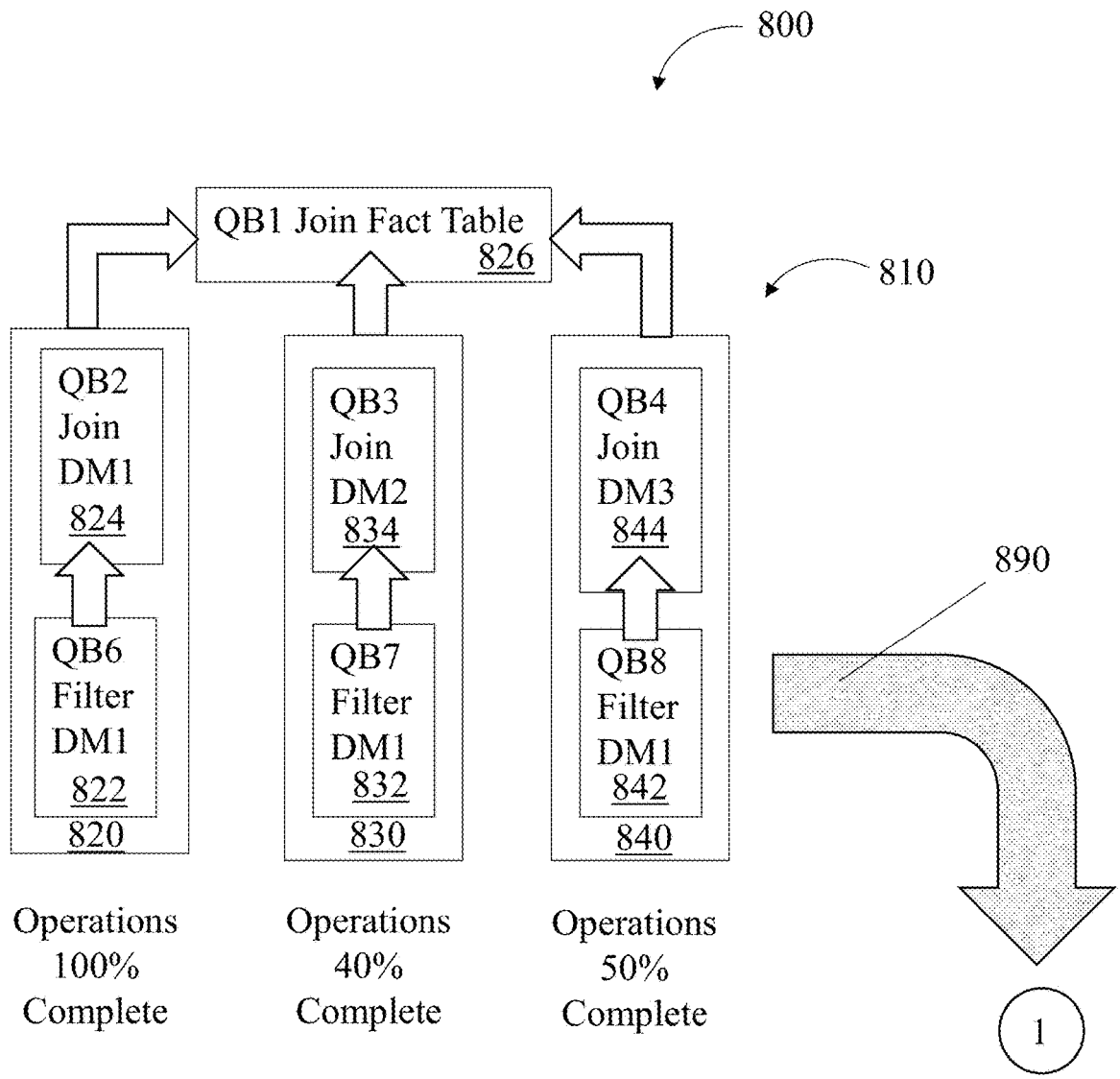
FIG. 8A is a block schematic diagram illustrating a first access path for an access path reconsider scheme, in accordance with some embodiments of the present disclosure.
Figure 8B:
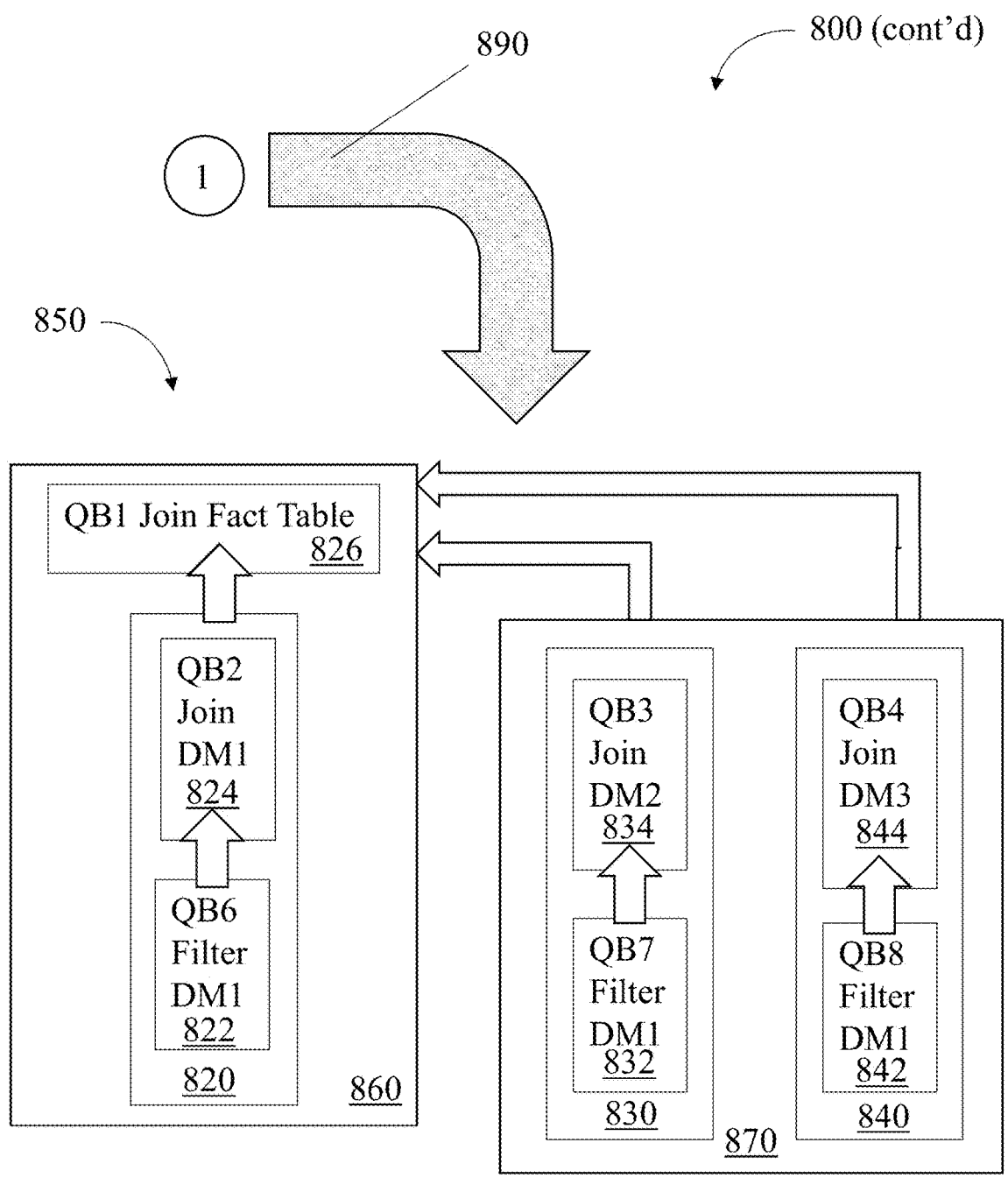
FIG. 8B is a block schematic diagram illustrating a second access path for an access path reconsider scheme, in accordance with some embodiments of the present disclosure.

Referring to FIGS. 8A and 8B, block schematic diagrams are presented illustrating a plurality of first access plan 810 and a second access plan 850, respectively, for an access path reconsideration scheme 800, in accordance with some embodiments of the present disclosure. Initially referring to FIG. 8A, in at least some embodiments, the first access plan 810 includes access paths 820, 830, and 840, where each of the access paths 820, 830, and 840 are considered through mechanisms that include, without limitation, the resource consumption costs calculation mechanism 200 (as shown and described with respect to FIG. 2). In the access path 820, a query block (QB) QB6 includes SQL instructions for filtering a first dimension table (DM1), thereby defining a QB6 filter DM1 822. Also, in the access path 820, a QB2 includes SQL instructions for joining the first dimension table (DM1) with a QB1 join fact table 826, thereby defining a QB2 join DM1 824. In the access path 830, a QB7 includes SQL instructions for filtering the first dimension table (DM1), thereby defining a QB7 filter DM1 832. Also, in the access path 830, a QB3 includes SQL instructions for joining a second dimension table (DM2) with the QB1 join fact table 826, thereby defining a QB2 join DM2 834. Similarly, in the access path 840, a QB8 includes SQL instructions for filtering the first dimension table (DM1), thereby defining a QB8 filter DM1 842. Also, in the access path 840, a QB4 includes SQL instructions for joining a third dimension table (DM3) with the QB1 join fact table 826, thereby defining a QB4 join DM3 844. Accordingly, the plurality of data access paths 820, 830, and 840 define a first access plan 810 subject to calculated resource constraints.

In one or more embodiments, the SQL instructions for the filtering (822, 832, 842) and joining (824, 834, 844) operations of the first dimension table (DM1) through the data access paths 820, 830, and 840 are executed in parallel and each access path is executed at a different pace such that once the first access path 820 is 100% complete, the second access path is 40% complete, and the third access path 840 is 50% complete. The instructions associated with the aforementioned fact table joining operations i.e., QB1 join fact table 826, will not be executed until all three of the access path operations 820, 830, and 840 are 100% complete. Accordingly, the access plan 810 includes undesired latencies.

In some embodiments, the tool 140, and more specifically, the access path reconsideration module 148 (see FIG. 1), as a function of executing the semi-joins 504 (discussed in FIG. 5), and prior to data extraction resulting from full-joins, reconsiders the whole access plan 810, i.e., evaluates, without limitation, different join methods, using different query blocks, and rearranging the initial query blocks into a new configuration. In some embodiments, the access path reconsideration will result in, after executing one query block in the original access path configuration, building some new access paths that can support the execution of the operations shown in FIG. 8A. In some embodiments, the access path reconsideration module 148 will operate in conjunction with the cost calculation module 142 and the access path selection module 144. In some embodiments, the reconsideration module 148, the cost calculation module 142, and the access path selection module 144 are combined into a single module.

Now referring to FIG. 8B, in at least some embodiments, the second access plan 850 includes access paths 860 and 870, where each of the access paths 860 and 870 are reconsidered through mechanisms that include, without limitation, the resource consumption costs calculation mechanism 200 (as shown and described with respect to FIG. 2). The second access plan 850 includes the first access plan's 810 components rearranged into a new configuration, i.e., as indicated by the arrow 890. Specifically, since the tool 140 calculates that the operations associated with the first access path 820 will finish first, the QB1 join fact table 826 and the access path 820 are reconfigured into an access path 860. In addition, the access paths 830 and 840 are reconfigured to define an access path 870 such that the execution of the access paths 830 and 840 subject to the full-join do not inject unnecessary latencies into the execution of the operations associated with the first access path 820. In some embodiments, the tool 140 may further reconsider and separate the access paths 830 and 840 in a manner similar to that performed for transitioning access path 820 to access path 860. Accordingly, the first access plan 810 is reconsidered subject to calculated resource constraints and is reconfigured into the second access plan 850.

Figure 9:
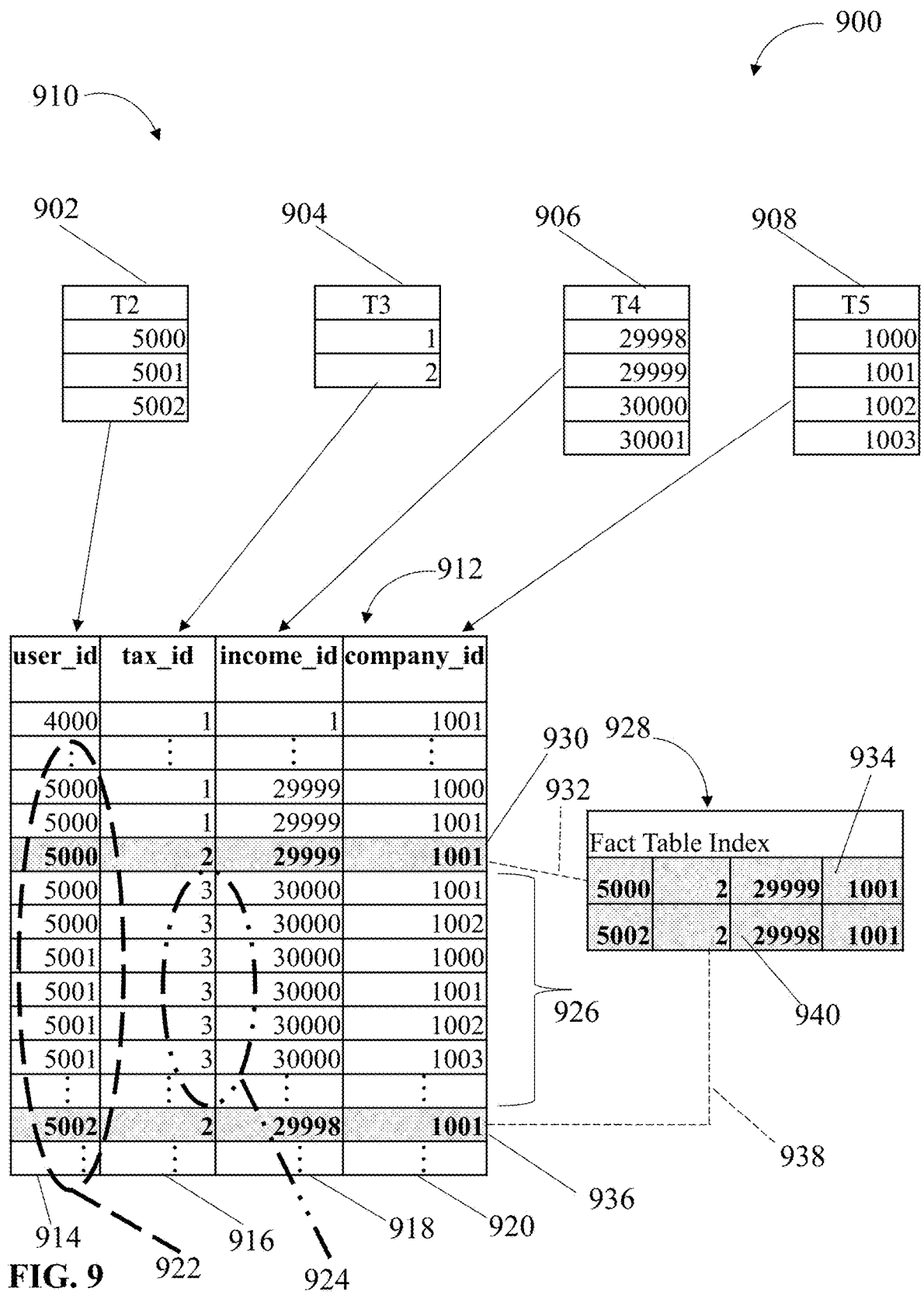
FIG. 9 is a block schematic diagram illustrating an example of a return of results to a database query, in accordance with some embodiments of the present disclosure.

FIG. 9 is a block schematic diagram illustrating an example 900 of a return of results to a database query, in accordance with some embodiments of the present disclosure. The example 900 includes a first dimension table (T2) 902 that includes user ID data, a second dimension table (T3) 904 that includes tax ID data, a third dimension table (T4) 906 that includes income ID data, and a fourth dimension table (T5) 908 that includes company data ID. The four dimension tables 902, 904, 906, and 908 are shown in a star schema 910 with a fact table 912. In some embodiments, the operations described with respect to FIG. 9 are executed through the data fetch and join-back module 150 (see FIG. 1).

In at least some embodiments, the first dimension table (T2) 902 includes the values 5000, 5001, and 5002 representative of the respective unique user IDs. The second dimension table (T3) 904 includes the values 1 and 2 representative of the respective unique tax IDs. The third dimension table (T4) 906 includes the values 29998, 29999, 30000, and 30001 representative of the respective unique income IDs. The fourth dimension table (T5) 908 includes the values 1000, 1001, 1002, and 1003 representative of the respective unique company IDs. These values associated with the dimension tables 902 through 908 are indicative of a present database query.

In some embodiments, the first dimension table (T2) 902 fully-joins to the fact table 912 through a "user_id" column 914 via the respective fact table foreign key and the dimension table primary key. The second dimension table (T3) 904 fully-joins to the fact table 912 through a "tax_id" column 916 via the respective fact table foreign key and the dimension table primary key. The third dimension table (T4) 906 fully-joins to the fact table 912 through an "income_id" column 918 via the respective fact table foreign key and the dimension table primary key. The fourth dimension table (T5) 908 fully-joins to the fact table 912 through a "company_id" column 920 via the respective fact table foreign key and the dimension table primary key.

Therefore, in at least some embodiments, for example, the user_id column 914 has the values 5000, 5001, and 5002 shown as a grouping 922. The tax_id column 916 includes the values 1, 2, and 3, where the values of 3 are shown as a grouping 924. The value of 3 is not relevant to the present database query; therefore those respective records 926 are not included in the fact table index 928. The record 930 is reflected 932 in the fact table index 928 as line 932, and the record 936 is reflected 938 as line 940 in the fact able index 928.

In some embodiments, the join-back operation of the fact table 912 to the dimension tables 902 through 908 is configured to employ the sort avoid algorithm such that upon completion of the data extraction from the dimension tables 902 through 908, the join-back operation is directed toward the fact table index result set 934 to skip or remove any unnecessary (irrelevant) data from the fact table 912 in advance of finalizing the results.

Figure 10A:
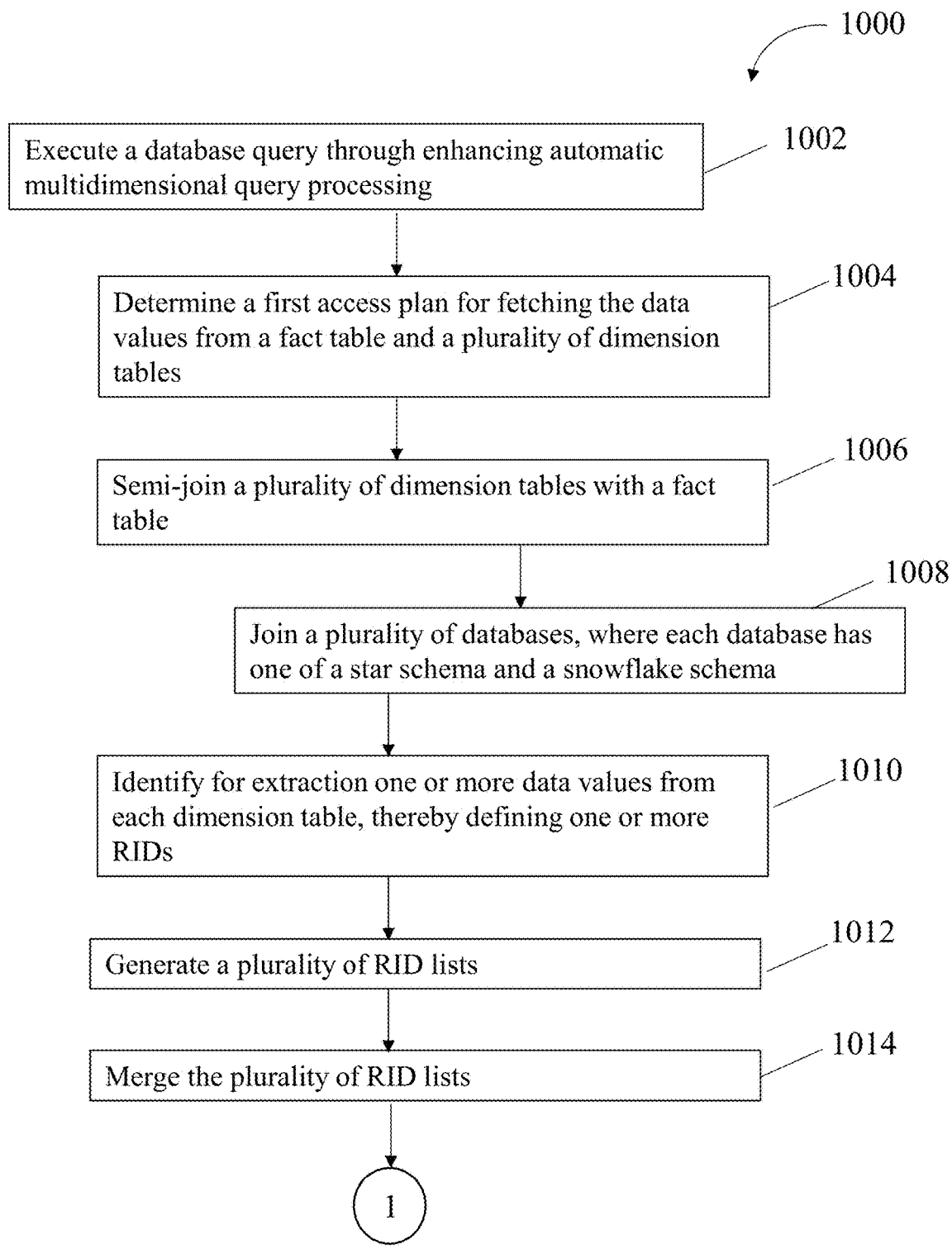
FIG. 10A is a flowchart illustrating a process for enhancing automatic multidimensional query processing, in accordance with some embodiments of the present disclosure.

Referring to FIG. 10A, a flowchart is provided illustrating a process 1000 for enhancing automatic multidimensional query processing, in accordance with some embodiments of the present disclosure. The process includes executing 1002 a database query through enhancing automatic multidimensional query processing. Such executing 1002 includes determining 1004 a first access path, i.e., a first access plan 810 (see FIG. 8) for fetching the data values from the fact table 412 and a plurality of dimension tables 414 (see FIG.

4), where such consideration is based on resource costs. Such executing 1002 also includes semi-joining 1006 the plurality of dimension tables 414 (in parallel) with the fact table 412.

In some embodiments that include one or more databases with star schema and/or snowflake schema, the executing 1002 includes joining 1008 (in parallel) at least a portion of those databases. The executing 1002 further includes identifying 1010 for extraction one or more data values from each dimension table 414 (in parallel), wherein the data values from each dimension table 414 are associated with a respective record identification (RID), thereby defining one or more RIDs for each joining 1006. Additionally, a plurality of RID lists 508 (see FIG. 5) are generated 1012 (in parallel), where each RID list 508 includes a collection of the one or more RIDs for the respective dimension table 414, and these RID lists 508 are merged 1014.

Figure 10B:
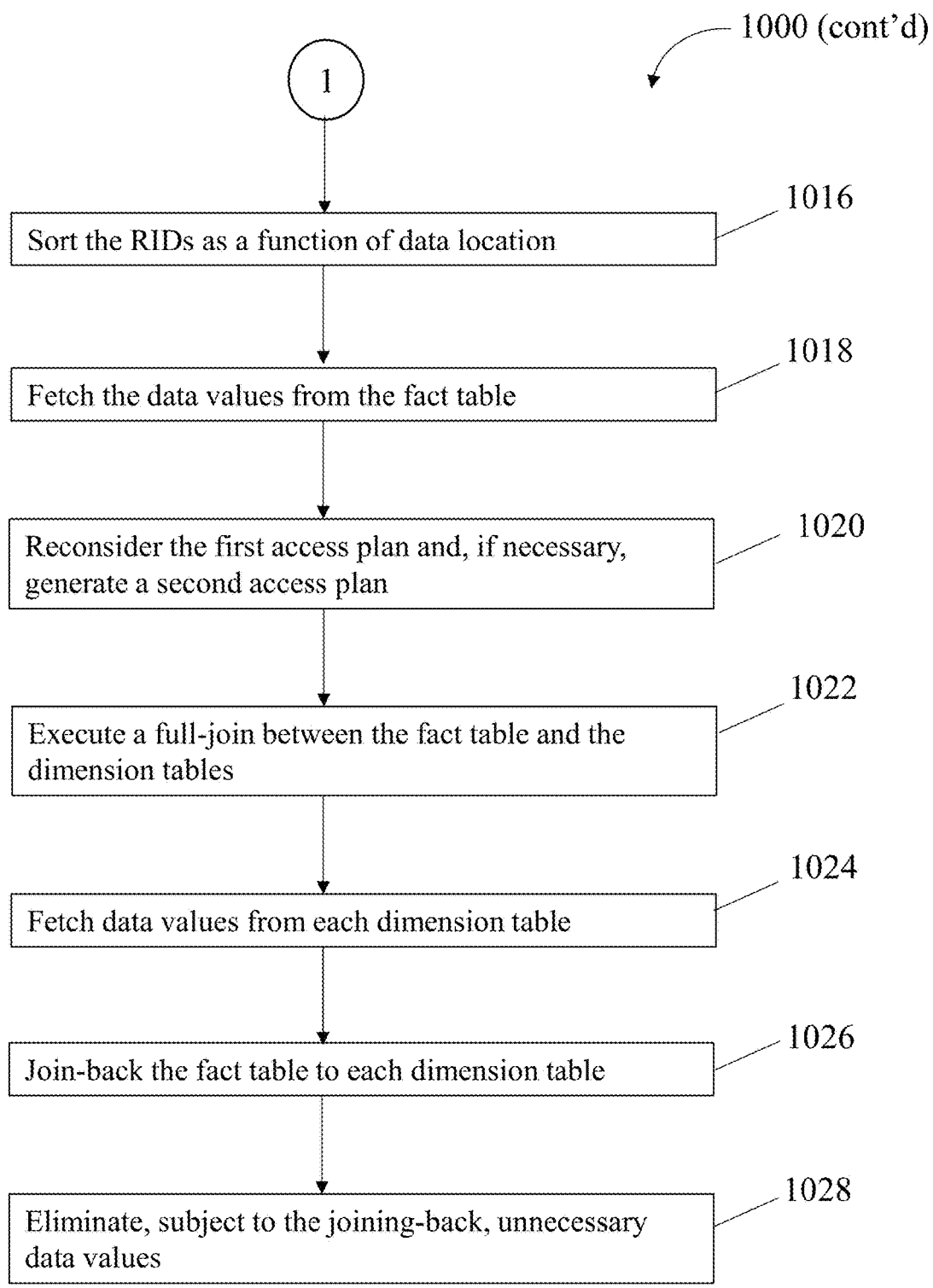
FIG. 10B is a continuation of the flowchart of FIG. 10A, in accordance with some embodiments of the present disclosure.

Referring to FIG. 10B, a continuation of the flowchart of FIG. 10A is presented. The executing 1002 includes sorting 1016, subject to the merging 1014 of the RID lists 508, the plurality of RIDs as a function of data location. The executing 1002 also includes fetching 1018 (in parallel) the data values from the fact table 412. The executing 1002 further includes reconsideration 1020 of the first determined access plan 810, and if necessary, generating a revised (second) access plan 850, based on resource costs. The executing 1002 also includes executing 1022 a full-join between the fact table 412 and the dimension tables 414 in parallel and fetching 1024 (in parallel) one or more data values from each dimension table 414 that have been previously identified for extraction (see method step 1010). The executing 1002 further includes joining-back 1026 the fact table 412 to each dimension table 414 (in parallel) and, if necessary, eliminating 1028, subject to the joining-back 1026, unnecessary data values.

The system, computer program product, and method as disclosed and described herein are configured for enhancing automatic multidimensional query processing, and, more specifically, for to automatically merging and sorting record identifications (RIDs) prior to executing data fetches to satisfy a database query. The system, computer program product, and method facilitate enhanced processing of incoming queries to a database that includes one of a star schema and a snowflake schema, i.e., a fact table and a plurality of dimension tables.

Moreover, the embodiments described herein are integrated into a practical application through the combination of elements to implement parallelism, i.e., parallel execution of otherwise independent activities such as semi-joining each dimension table with the associated fact table through a respective fact table index and joining-back the fact table to the dimension tables. Such parallelizing of a query optimizer facilitates benefitting from advanced CPU designs that exploit an increasing number of cores, where query optimization is possibly the most CPU-intensive process in a database system. Accordingly, effective usage of CPUs translates to better query plans and hence better overall system performance.

Furthermore, the practical implementation of the elements described herein results in the system configured to perform RID sort and merge of the rid lists to form the final fact table RID list to more effectively and efficiently identify and fetch data from the fact table using the final RID list. Additionally, reconsideration of the access paths after the dimension tables-to-fact table semi-joins facilitates further improving the effectiveness and efficiency of query processing through adding new join methods (prior to the full-join) that provide improved query performance with simplified index design, adding an increased number of dimensions through the extra data parallelism, and run-time adaptation when the actual filtering does not match the optimizer's estimates. In some embodiments, with each query, the process facilitates calculating existing index performance to choose the most effective table/index pairs. In some embodiments, the access path reconsideration process dynamically alters which dimensions will have their fact table filtering intersected via index ANDing.

Figure 11:
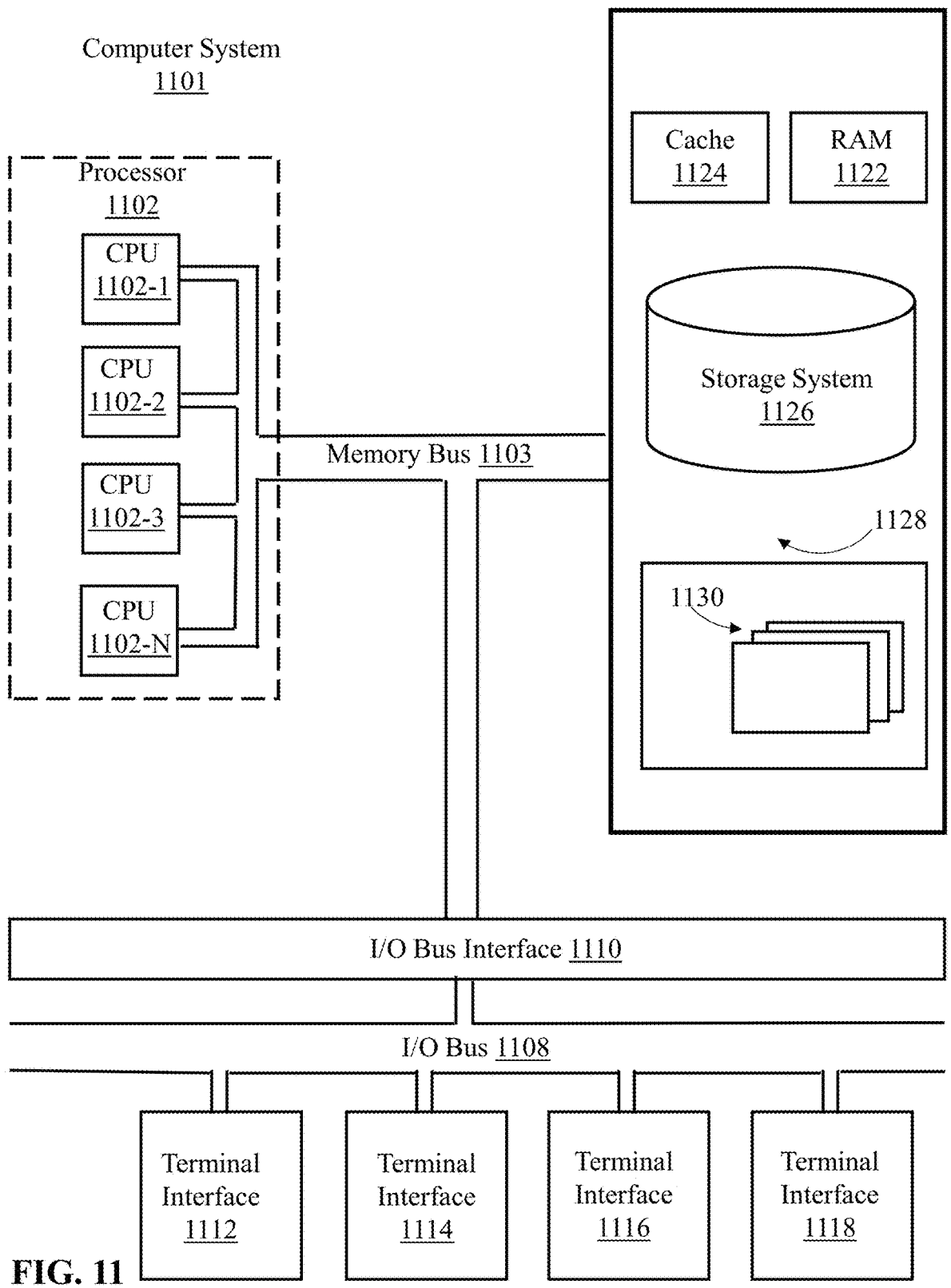
FIG. 11 is a block schematic diagram illustrating a computing system, in accordance with some embodiments of the present disclosure.

Referring now to FIG. 11, a block schematic diagram is provided illustrating a computing system 1101 that may be used in implementing one or more of the methods, tools, and modules, and any related functions, described herein (e.g., using one or more processor circuits or computer processors of the computer), in accordance with some embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface unit 1110.

The computer system 1101 may contain one or more general-purpose programmable central processing units (CPUs) 1102-1, 1102-2, 1102-3, 1102-N, herein collectively referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache.

System memory 1104 may include computer system readable media in the form of volatile memory, such as random access memory (RAM) 1122 or cache memory 1124. Computer system 1101 may further include other removable/non-removable, volatile/non-volatile computer system storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1104 can include flash memory, e.g., a flash memory stick drive or a flash drive. Memory devices can be connected to memory bus 1103 by one or more data media interfaces. The memory 1104 may include at least one program product having a set (e.g., at least one) of program modules that are configured to carry out the functions of various embodiments.

Although the memory bus 1103 is shown in FIG. 11 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single respective units, the computer system 1101 may, in some embodiments, contain multiple I/O bus interface units 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 11 is intended to depict the representative major components of an exemplary computer system 1101. In some embodiments, however, individual components may have greater or lesser complexity than as represented in FIG. 11, components other than or in addition to those shown in FIG. 11 may be present, and the number, type, and configuration of such components may vary.

One or more programs/utilities 1128, each having at least one set of program modules 1130 may be stored in memory 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1128 and/or program modules 1130 generally perform the functions or methodologies of various embodiments.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

A cloud computing environment is service oriented with a focus on statelessness, low coupling, modularity, and semantic interoperability. At the heart of cloud computing is an infrastructure that includes a network of interconnected nodes. The system 1101 may be employed in a cloud computing environment.

Figure 12:
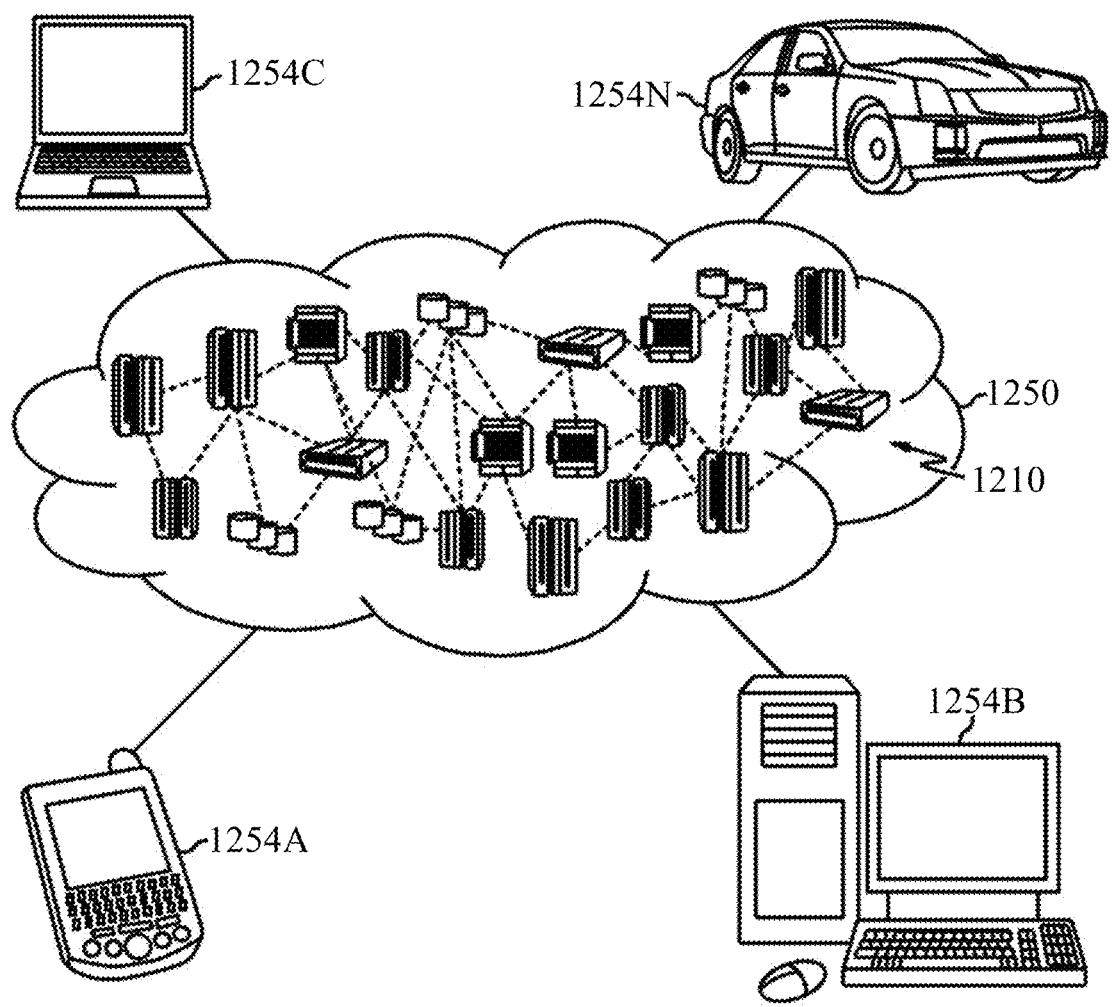
FIG. 12 is a block schematic diagram illustrating a cloud computing environment, in accordance with some embodiments of the present disclosure.

Referring to FIG. 12, a schematic diagram is provided illustrating a cloud computing environment 1250, in accordance with some embodiments of the present disclosure. As shown, cloud computing environment 1250 comprises one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 may communicate with any type of computerized device over any type of network and/or network addressable connection (e.g., using a web browser).

Figure 13:
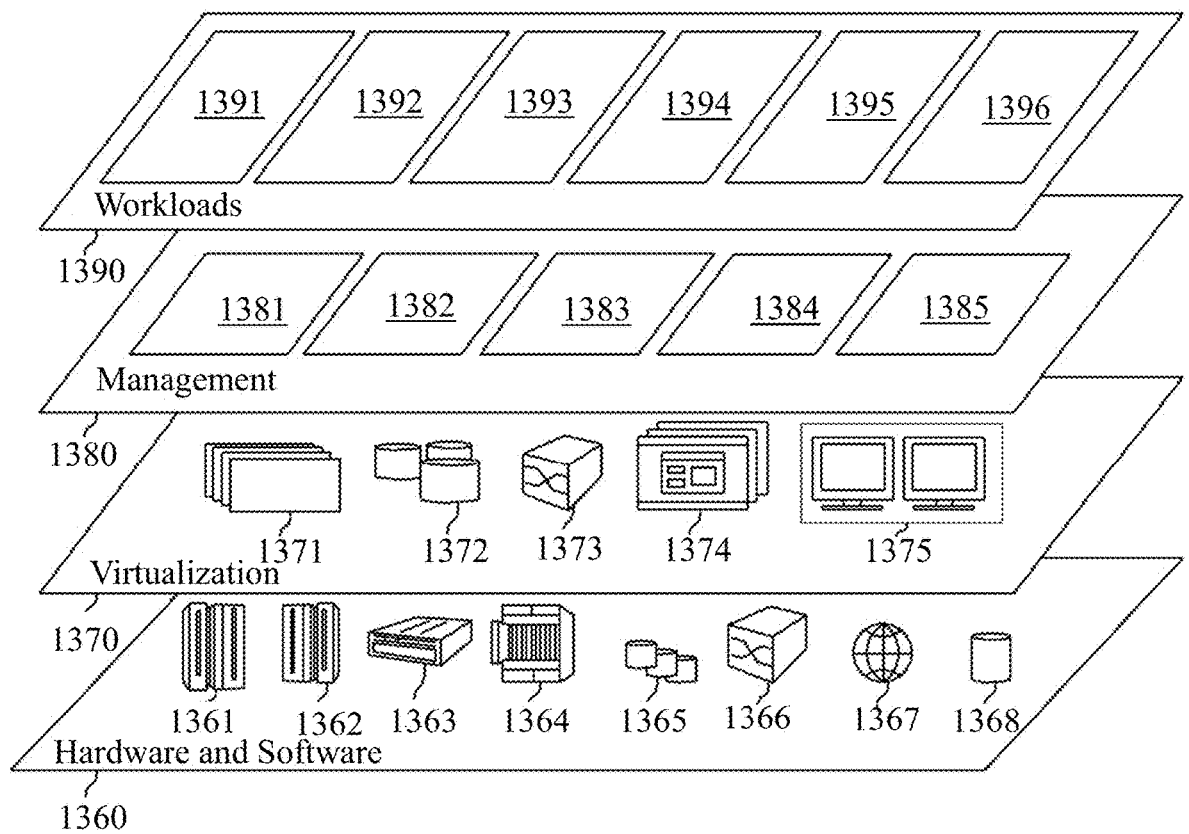
FIG. 13 is a block schematic diagram illustrating a set of functional abstraction model layers provided by the cloud computing environment, in accordance with some embodiments of the present disclosure.

Referring to FIG. 13, a schematic diagram is provided illustrating a set of functional abstraction model layers provided by the cloud computing environment 1350 (FIG. 13), in accordance with some embodiments of the present disclosure. It should be understood in advance that the components, layers, and functions shown in FIG. 13 are intended to be illustrative only and embodiments of the disclosure are not limited thereto. As depicted, the following layers and corresponding functions are provided:

Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Examples of workloads and functions which may be provided from this layer include: mapping and navigation 1391; software development and lifecycle management 1392; layout detection 1393; data analytics processing 1394; transaction processing 1395; and to enhancing automatic multi-dimensional query processing 1396.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for enhancing automatic multidimensional query processing comprising:
    one or more processing devices;
    one or more memory devices communicatively and operably coupled to the one or more processing devices;
    a database query enhancement tool, at least partially resident within the one or more memory devices, configured to execute an enhancement directed toward the automatic multidimensional query processing to execute a database query, the database query enhancement tool configured to:
    semi-join a plurality of dimension tables with a fact table;
    identify for extraction one or more data values from each dimension table of the plurality of dimension tables, wherein the one or more data values from each dimension table of the plurality of dimension tables are associated with a respective record identification (RID), thereby defining one or more RIDs, a respective dimension table of the plurality of dimension tables for each RID of the one or more RIDs, and a plurality of data values;
    generate a plurality of RID lists, wherein each RID list of the plurality of RID lists includes a collection of the one or more RIDs for the respective dimension table;
    merge the plurality of RID lists, thereby define a plurality of RIDs;

sort, subject to the merging, the plurality of RIDs as a function of data location; and fetch the plurality of data values from the fact table.

2. The system of claim 1, wherein the database query enhancement tool is further configured to:

full-join each dimension table of the plurality of dimension tables to the fact table; and fetch the one or more data values from each dimension table of the plurality of dimension tables.

3. The system of claim 2, wherein the database query enhancement tool is further configured to:

eliminate, subject to a joining-back between the fact table and the plurality of dimension tables, unnecessary data values of the one or more data values.

4. The system of claim 2, wherein the database query enhancement tool is further configured to:

determine a first access plan for fetching the one or more data values from the fact table and the plurality of dimension tables;

reconsider the first determined access plan; and determine a second access plan for fetching the one or more data values from the fact table and the plurality of dimension tables.

5. The system of claim 3, wherein the database query enhancement tool is further configured to:

execute the semi-join between the plurality of dimensions tables and the fact table in parallel;

execute the full join between the plurality of dimension tables and the fact table in parallel; and execute the joining-back operation between the fact table and the plurality of dimension tables in parallel.

6. The system of claim 1, wherein the database query enhancement tool is further configured to:

determine one or more conditions to be met to semi-join one or more dimension tables of the plurality of dimension tables to the fact table;

satisfy the one or more conditions; and filter on the one or more dimension tables of the plurality of dimension tables.

7. The system of claim 1, wherein the database query enhancement tool is further configured to:

join a plurality of databases together, wherein each database has one of a star schema and a snowflake schema.

8. A computer program product embodied on at least one computer readable storage medium having computer executable instructions for enhancing automatic multidimensional query processing that when executed cause one or more computing devices to:

semi-join a plurality of dimension tables with a fact table;

identify for extraction one or more data values from each dimension table of the plurality of dimension tables, wherein the one or more data values from each dimension table of the plurality of dimension tables are associated with a respective record identification (RID), thereby defining one or more RIDs, a respective dimension table of the plurality of dimension tables for each RID of the one or more RIDs, and a plurality of data values;

generate a plurality of RID lists, wherein each RID list of the plurality of RID lists includes a collection of the one or more RIDs for the respective dimension table;

merge the plurality of RID lists, thereby define a plurality of RIDs;

sort, subject to the merging, the plurality of RIDs as a function of data location; and fetch the plurality of data values from the fact table.

9. The computer program product of claim 8, further having computer executable instructions to:

full-join each dimension table of the plurality of dimension tables to the fact table; and fetch the one or more data values from each dimension table of the plurality of dimension tables.

10. The computer program product of claim 9, further having computer executable instructions to:

eliminate, subject to a joining-back between the fact table and the plurality of dimension tables, unnecessary data values of the one or more data values.

11. The computer program product of claim 9, further having computer executable instructions to:

determine a first access plan for fetching the one or more data values from the fact table and the plurality of dimension tables;

reconsider the first determined access plan; and determine a second access plan for fetching the one or more data values from the fact table and the plurality of dimension tables.

12. The computer program product of claim 10, further having computer executable instructions to:

execute the semi-join between the plurality of dimensions tables and the fact table in parallel;

execute the full join between the plurality of dimension tables and the fact table in parallel; and execute the joining-back operation between the fact table and the plurality of dimension tables in parallel.

13. The computer program product of claim 8, further having computer executable instructions to:

determine one or more conditions to be met to semi-join one or more dimension tables of the plurality of dimension tables to the fact table;

satisfy the one or more conditions; and filter on the one or more dimension tables of the plurality of dimension tables.

14. A computer-implemented method for enhancing automatic multidimensional query processing comprising:

executing a database query comprising:

semi-joining a plurality of dimension tables with a fact table;

identifying for extraction one or more data values from each dimension table of the plurality of dimension tables, wherein the one or more data values from each dimension table of the plurality of dimension tables are associated with a respective record identification (RID), thereby defining one or more RIDs, a respective dimension table of the plurality of dimension tables for each RID of the one or more RIDs, and a plurality of data values;

generating a plurality of RID lists, wherein each RID list of the plurality of RID lists includes a collection of the one or more RIDs for the respective dimension table;

merging the plurality of RID lists, thereby defining a plurality of RIDs;

sorting, subject to the merging, the plurality of RIDs as a function of data location; and fetching the plurality of data values from the fact table.

15. The method of claim 14, further comprising:

full joining each dimension table of the plurality of dimension tables to the fact table; and fetching the one or more data values from each dimension table of the plurality of dimension tables.

16. The method of claim 15, further comprising:
eliminating, subject to a joining-back between the fact table and the plurality of dimension tables, unnecessary data values of the one or more data values.

17. The method of claim 15, further comprising:
determining a first access plan for fetching the one or more data values from the fact table and the plurality of dimension tables;
reconsidering the first determined access plan; and
determining a second access plan for fetching the one or more data values from the fact table and the plurality of dimension tables.

18. The method of claim 16, further comprising:
executing the semi joining between the plurality of dimensions tables and the fact table in parallel;
executing the full joining between the plurality of dimension tables and the fact table in parallel; and
executing the joining-back operation between the fact table and the plurality of dimension tables in parallel.

19. The method of claim 14, further comprising:
determining one or more conditions to be met to semi-join one or more dimension tables of the plurality of dimension tables to the fact table;
satisfying the one or more conditions; and
filtering on the one or more dimension tables of the plurality of dimension tables.

20. The method of claim 14, further comprising:
joining a plurality of databases together, wherein each database has one of a star schema and a snowflake schema.

* * * * *